United States Patent

Gibbs

[15] 3,635,300
[45] Jan. 18, 1972

[54] CONTROL DEVICE FOR SELF-PROPELLED TOWED VEHICLE

[72] Inventor: Joseph B. Gibbs, Route 1, Rocheport, Mo. 65279

[22] Filed: Jan. 5, 1970

[21] Appl. No.: 622

[52] U.S. Cl. .................................180/14 A, 60/54.5 E
[51] Int. Cl. ..............................................B60d 7/00
[58] Field of Search ..............180/14, 14 A, 14 B, 14 D, 66; 60/54.5 E

[56] References Cited

UNITED STATES PATENTS

| | | | |
|---|---|---|---|
| 3,035,653 | 5/1962 | Steepe | 180/14 |
| 2,581,792 | 1/1952 | Goodell, Jr. | 60/54.5 E |
| 3,212,263 | 10/1965 | Hann | 180/66 |
| 2,561,167 | 7/1951 | Beaman | 180/66 |
| 2,526,570 | 10/1950 | Majneri | 60/54.5 E |

Primary Examiner—Leo Friaglia
Assistant Examiner—John P. Silverstrim
Attorney—Scofield, Kokjer, Scofield & Lowe

[57] ABSTRACT

A device for controlling the operation of a self-propelled towed vehicle has an extensible drawbar with two telescoping parts capable of relative movement therebetween. A piston of a master hydraulic cylinder is fixedly attached to one of the drawbar parts and is positionable in accordance with the relative movement thereof. Each towed vehicle has an associated master cylinder which effects the control of the movement of one or more pistons of slave hydraulic cylinders, which in turn control the hydrostatic transmission and source of motive power with its respective towed vehicle. Hydraulic linkages are provided with respect to each drawbar master cylinder and the slave cylinders to insure increased motive power as the load in towed vehicle increases. In this regard, the hydrostatic transmission is controlled and the source of motive power regulated for the towed vehicle when the towed vehicle overtakes the towing device due to broken control springs, quick stops, accidental uncouplings, or the like. The hydraulic system controlling the above functions further includes means to compensate for fluid expansion and contraction from temperature variations or system leaks.

5 Claims, 3 Drawing Figures

PATENTED JAN 18 1972 3,635,300

INVENTOR.
Joseph B. Gibbs
BY
ATTORNEYS

CONTROL DEVICE FOR SELF-PROPELLED TOWED VEHICLE

BACKGROUND AND BRIEF DESCRIPTION OF THE INVENTION

The concept of utilizing an extensible drawbar and a hydraulic circuitry for the activation of the source of motive power for a towed self-propelled vehicle has been disclosed in the patent to Steepe, U.S. Pat. No. 3,035,653 issued May 22, 1962. The primary advantage of such a system lies in the reduction of personnel heretofore required to operate two such vehicles and/or in the increased productivity of a single operator. A speed and operationally controlled device such as that described above has particular utility in proper utilization of self-propelled forage wagons with flotation tires utilized thereon. The concept of the towed self-propelled vehicle being comprised of a forage wagon, having a chopper feeding directly thereto, permits a single operator to harvest large tonnages without fear of soft field conditions or draft from the loaded forage wagon becoming so great that it robs power from the prime mover.

My invention utilizes a uniquely constructed hydraulic control system for manipulating a hydrostatic transmission and the source of motive power for each towed vehicle so that fluid expansion, contraction and leaks are automatically compensated for and so that the safety of the single operator is insured in the event that the towed vehicle overtakes the towing vehicle due to broken springs, quick stops, steep downhill grades, or accidental uncoupling, which might ordinarily permit the "runaway" of the filled forage wagon.

My invention utilizes an extensible drawbar concept with the piston of a master hydraulic cylinder interconnected therewith so as to undergo relative movement with respect to the cylinder during certain types of movement on the part of either the prime mover of the towed vehicles. A conventional gear-type pump and high-pressure safety release valve associated with the hydraulic fluid reservoir supplies and primes the hydraulic system with fluid. As the prime mover moves in a forward direction, the displaced fluid resulting from the piston movement of the master cylinder moves a slave cylinder piston outwardly thereof against the spring tension of one or more variable pressure regulators. These variable pressure regulators are hydraulically interconnected with the on and off positions of respective slave cylinders which interconnect with the hydrostatic transmission control linkages and motive power linkages of the towed vehicles. The regulators can then position related control linkages to control the movement of the respective towed vehicle with the movement of the prime mover.

If the prime mover is suddenly stopped or if the towed vehicle or vehicles overtake same, each master cylinder piston experiencing the above conditions moves in such a direction relative to the fluid in the one or more slave hydraulic cylinders attached to the control linkages, so that the pistons associated therewith are displaced in a direction to turn off the source of motive power (and regulate its transmission) utilized in conjunction with the towed vehicle. At the same time, a one-way flow valve precludes the variable pressure regulators from exerting a hydraulic reaction in the direction to advance the towed vehicle. In this manner, the safety of the operator of the prime mover is insured since the source of motive power of the towed vehicle is controlled hydraulically depending upon the reaction of the master cylinder and its associated hydraulic circuit.

The above system may be contrasted with known methods which rely entirely upon the spring tension or compression of conventional clutch and throttle controls. Furthermore, the use of the gear-type fluid pumps in conjunction with the regulators and one-way valves compensate for fluid leakage and expansion or contraction in the hydraulic system itself, due to temperature extremes. Other systems utilizing completely closed systems with little or no provision for bleeding same or for compensating for leaking oil rings cannot achieve the degree of reliability or more importantly, safety now possible with my device.

An object of my device is to provide a safe and reliable towed self-propelled vehicle with a unique speed control device for the source of motive power of the towed vehicle or vehicles.

Another object of my device is to provide a speed control for towed self-propelled vehicles which compensates for fluid linkage or expansion or contraction in the hydraulic system.

A primary object of my invention is to provide a unique speed control device for towed self-propelled vehicles which increases the productivity of a sole operator as well as substantially enhancing the forage carrying capacity normally associated with a single prime mover that heretofore was required to pull an unpowered forage wagon.

A further object of my invention is to provide a speed control device of the character described which operates independently of the amount of weight per towed vehicle. It is a feature of my invention that the draft of the prime mover is held to a minimum thereby allowing the power capabilities of same to be directed to other implements, if necessary.

A further object of my invention is to provide a unique speed control system for towed self-propelled vehicles utilizing hydrostatic transmissions.

A still further object of my invention is to provide a speed control system of the character described wherein one or more variable pressure regulators are utilized in conjunction with slave cylinders for operatively manipulating the control linkages of respective hydrostatic transmissions and throttles.

Other and further objects of the invention, together with the features of novelty appurtenant thereto, will appear in the course of the following description.

Detailed Description

Figure 1:
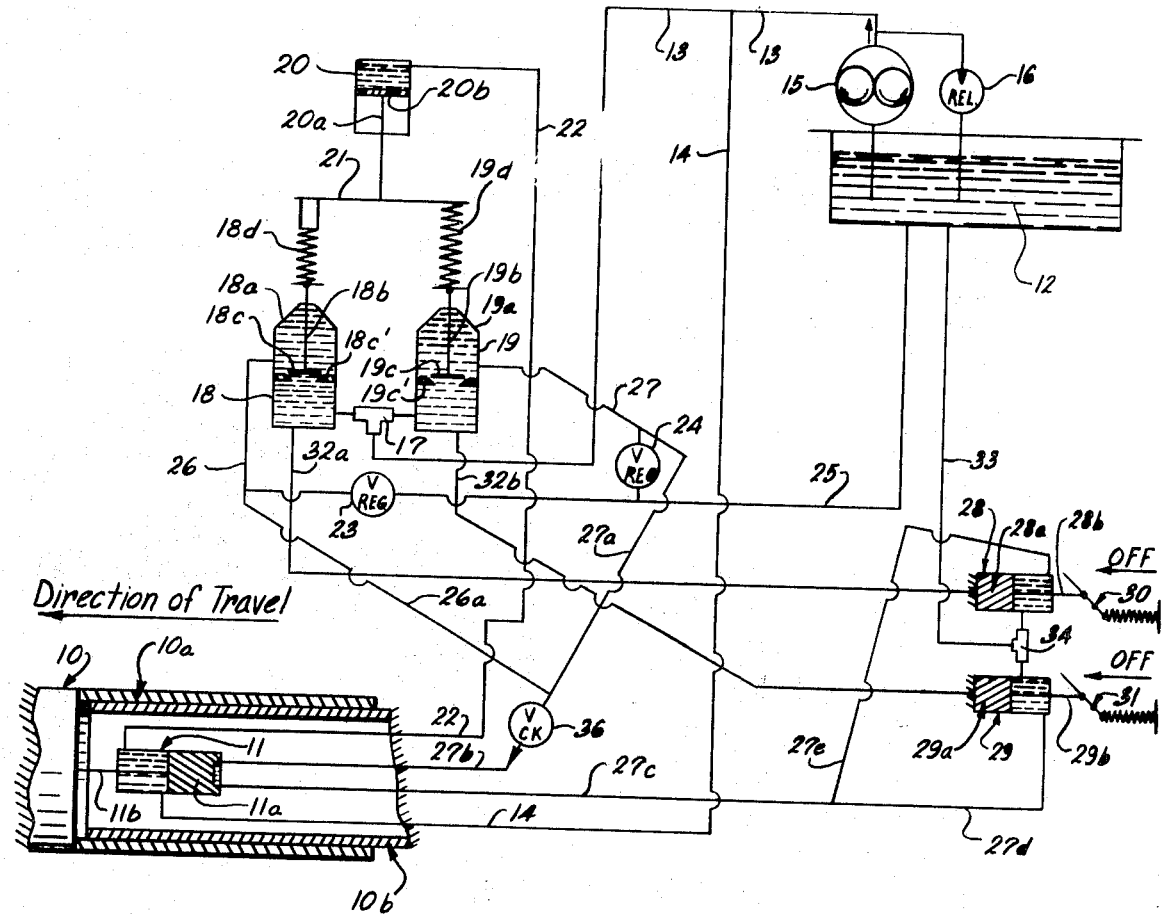
Figure 2:
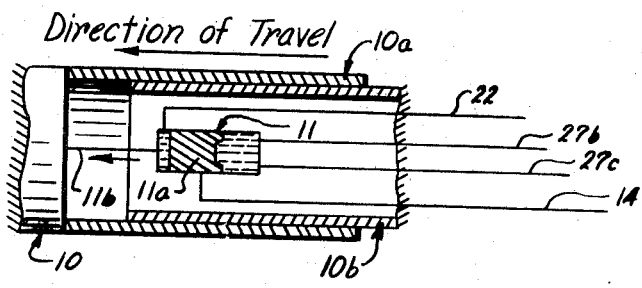
Figure 3:
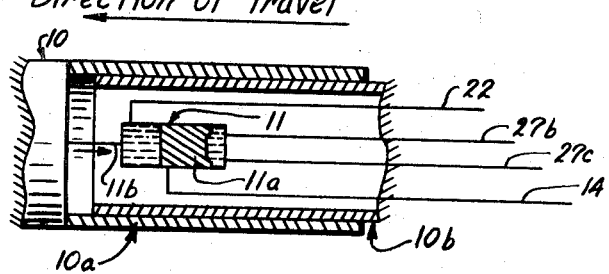

In the accompanying drawing, which forms a part of the specification and is to be read in conjunction therewith, and in which like reference numerals indicate like parts in the various views:

FIG. 1 is a hydraulic schematic diagram of the subject control system;

FIG. 2 is a schematic diagram of the extensible drawbar and master cylinder indicating the relative positions of same when both the self-propelled towed vehicle and the prime mover are moving or when the prime mover is in its initial moving stages; and FIG. 3 is a schematic view of the extensible drawbar and master cylinder when the self-propelled towed vehicle inadvertently overtakes the prime mover.

Turning now more particularly to the drawing, the extensible drawbar is generally indicated by the numeral 10. The drawbar is diagrammatically illustrated as being comprised of two telescoping parts 10a and 10b which permit relative movement therebetween within certain limits. For purposes of illustration, the extensible drawbar 10 is shown to include a master cylinder 11 which is fixedly attached to the drawbar part 10b and a piston 11a with its piston rod 11b fixedly attached to the drawbar part 10a. The hydraulic fluid is schematically indicated in the various figures however, it should be understood that the fluid is present in the various hydraulic lines shown schematically in single line dimension.

Master cylinder 10 is interconnected with the hydraulic fluid reservoir 12 by hydraulic lines 13 and 14 through a gear-type oil pump 15. A high-pressure safety release valve 16 is paralleled with pump 15 for protective purposes. As shown in the various figures, line 14 interconnects with master cylinder 11 at a location relative to the possible positions of piston 11a so that fluid may either enter cylinder 11 or to be blocked from entering same by said piston.

Line 13 continues from its junction with line 14 to a flow divider 17, same directing the hydraulic fluid to one or more of the variable pressure regulators indicated in FIG. 1 by the numerals 18 and 19. The regulator housings 18a and 19a have spring biased valve stems (18b and 19b respectively) with their associated valve heads (18c and 19c respectively). The valves of each regulator are designed to move relative to the valve-type orifice in each regulator valve seat 18c' and 19c'. Compression springs 18d and 19d may have different K values and are used to apply different downward pressures on their respective valves stems and in a direction to close the above-mentioned orifice. A slave cylinder 20 has its associated piston rod 20a (and piston 20b) mechanically linked with the compression springs of the regulators 18 and 19 by the bracket 21. Accordingly, the movement of piston 20b moves the valve stem of each regulator, however, with different degrees of force, due to the different spring biases allocated to same. As will be described in more detail later, the fluid pressure within slave cylinder 20 and the movement of piston 20b is controlled by the position of piston 11a and the pressure on the hydraulic fluid within master cylinder 11 as same is interconnected with cylinder 20 via hydraulic line 22.

Each regulator is connected from reservoir 12 through a fixed low-pressure regulator 23 and 24 to the housing portion above the valve seats 18c' and 19c' respectively. For example, hydraulic line 25, fixed low-pressure regulator 23 and line 26 interconnect reservoir 12 with the above-mentioned portion of regulator 18 while lines 25, fixed low-pressure regulator 24 and line 27 interconnect the reservoir with a similar portion of variable pressure regulator 19.

As suggested above, the speed control system disclosed herein may be used to operate the control linkages of each hydrostatic transmission and source of motive power associated with each one of the self-propelled towed vehicles. In this regard, I have shown two slave cylinders (one of which controls the transmission, while the other controls the power linkages) 28 and 29 which have associated pistons 28a and 29a along with piston rods 28b and 29b respectively. The transmission linkages are generally indicated by the numeral 30, while the motive power linkages are shown at 31.

Each of the slave cylinders 28 and 29 are interconnected with an associated variable pressure regulator. For instance, hydraulic line 32a coming out of the lower portion of pressure regulator 18 interconnects same with the left-hand end portion of slave cylinder 28. In a similar manner, hydraulic line 32b interconnects the lower portion of regulator 19 with the left-hand portion of the slave cylinder 29. Also, hydraulic line 33 extends from reservoir 12 to flow divider 34 and from thence to each of the slave cylinders 28 and 29.

Continuing the discussion of the hydraulic circuitry of the control system, master cylinder 11, at the right-hand end thereof, is interconnected with the upper portion of the variable regulators 18 and 19 via hydraulic lines 26, 26a and 27, 27a respectively, a one-way valve 36 and line 27b. The right-hand end portion of master cylinder piston 11a is appropriately constructed to hydraulically interconnect the incoming hydraulic line 27b with the outgoing line 27c, same being later paralleled at 27d and 27e to interconnect with the right-hand portions of slave cylinders 29, 28 respectively.

In operation, the diagrammatic view shown in FIG. 1 represents the condition of each speed control device including the drawbar and related master cylinder 11 with the prime mover and the self-propelled towed vehicle stopped or in neutral. Further, assume that the normal direction of travel is from right to left. Under the conditions described above, there exists only two different fluid pressure conditions (low pressure and zero pressure). For example, a zero pressure on the hydraulic fluid exists on the right-hand portions of the slave cylinders 28 and 29, on lines 27d, 27e, 27c, 27b, 27a, 27, 33, and finally to the upper portion of the variable pressure regulator 19. Likewise, the zero pressure hydraulic lines include 26a, 26, and the upper portion of regulator 18, as well as the reservoir return line 25. Hydraulic lines 13 and 14 which are on the downstream side of the gear-type pump 15 have a very low pressure conditioned thereon, however, it is still a measurable pressure exceeding that mentioned above with respect to the zero pressure lines. As a result, a low-pressure condition exists on the lower portion of both variable pressure regulators and on lines 32a and 32b which interconnect with the left-hand portion of the slave cylinders 28 and 29 respectively. Also, the low-pressure condition on line 14 exists in conjunction with the low-pressure condition on the left-hand portion of master cylinder 11, line 22, and on the upper portion of the first slave cylinder 20.

Under the conditions described above with respect to both the prime mover and the self-propelled towed vehicle in the at-rest or neutral positions, the speed control system described above locates pistons 28a and 29a of the slave cylinders so that the control linkages of the hydrostatic transmission throttle associated with each self-propelled towed vehicle is moved to the off position. As shown in FIG. 1, this off or neutral position is represented by control linkages 30 and 31 being pivoted so that the upper end is pushed forward or to the left. As a result, no motive force is applied to the towed vehicle.

As the prime mover begins its forward travel (to the left as shown in figures), the extensible drawbar 10 moves therewith so that the telescoping outer portion 10a which is directly connected to the prime mover experiences relative movement with respect to part 10b thereby moving piston 11a with respect to the master cylinder 11. This piston movement creates a positive displacement high-pressure fluid on the left-hand portion of master cylinder 11 and on hydraulic line 22 which is transmitted to the fluid in the upper portion of slave cylinder 20. At the same time, piston 11 moves to cut off line 14 from its normal or nonrestricted entrance with respect to the interior of cylinder 11.

As suggested above, the displaced fluid to the left of master cylinder 11 results in the downward movement of piston 20b (and piston rod 20a) within the slave cylinder 20. As a result, bracket 21 moves against the spring loads of springs 18d and 19d to cause valve heads 18c and 19c to partially seat relative to their respective orifices. The above-mentioned seating separates the two chambers in the variable pressure regulators according to hydraulic fluid pressure conditions. For example, the pressure now on hydraulic lines 13 and 14 on the downstream sides of the gear-type pump 15 is now moderate in value. As a result, the pressure within the lower portions of the variable pressure regulators 18 and 19 is also moderate as is the pressure on lines 32a and 32b which lead to the left-end portions of slave cylinders 28 and 29, respectively. Also, the pressure now on hydraulic line 14 which has been terminated by the relative movement of piston 11a with respect to master cylinder 11 is moderate in value.

As suggested above, a very low-hydraulic pressure now exists on the upper portion of regulator 18 and 19 with same being transmitted therefrom via lines 26-26a and 27-27a, respectively, to and through the one-way valve 36, line 27b, the right-hand portion of master cylinder piston 11a, lines 27c and from thence to the right-hand portion of slave cylinders 28 and 29 via hydraulic lines 27e and 27d, respectively. Accordingly, with the moderate pressure on the left-hand side of the pistons of the slave cylinders (and a very low-pressure condition on the right-hand side), the pistons are moved from the left to the right, hereby moving the control linkages 30 and 31 of the hydrostatic transmission and throttle, respectively, to the on position. In this manner, the movement of the prime mover and the resultant relative movement of drawbar 10 has caused the source of motive power of each of the self-propelled towed vehicles to turn on and to assist in the forward movement of the tandemly connected vehicles.

The utility of my control device is substantially enhanced by the built-in safety feature which operates to hydraulically insure that the sources of motive power for the self-propelled towed vehicles are automatically turned off when the towed device overtakes the prime mover because of broken linkage springs, quick stops on accidental uncouplings, etc. As shown in FIG. 3, when the towed vehicles overtake the prime mover or each other, the associated extensible drawbar operates to move the telescoped part 10b inwardly and forwardly relative to the telescoping part 10a. Accordingly, piston 11a is moved from the position shown in FIG. 2 to the position shown in FIG. 3 (from left to right). When in the position shown in FIG. 3, the fluid is displaced within master cylinder 11 and a high-pressure condition exists on both lines 27b and 27c. Since one-way check valve 36 precludes any affecting of the hydraulic lines upstream from same, the net result is to deliver a positive displacement high-pressure condition on the right-hand portion of each of the slave cylinders 28 and 29 via lines 27e and 27d, respectively.

Concurrently with the movement of piston 11a to the position shown in FIG. 3, the port entering master cylinder 11 at hydraulic line 14 remains closed so that the moderate pressure thereon has not significantly changed nor has the pressure on lines 13, 14, the lower portion of variable pressure regulators 18 and 19 and the pressure on the left-hand portion of the slave cylinders 28 and 29 (as delivered thereto by hydraulic lines 32a and 32b, respectively). A very low-pressure condition exists on the upper portion of the variable pressure regulators 18 and 19 and on the parallel hydraulic lines terminating on the upstream side of the one-way check valve 36. A substantially zero pressure exists on return line 25, regulator 23 and 24 on the left-hand side of master cylinder 11, hydraulic line 22, and the upper portion of slave cylinder 20 above piston 20b. Likewise, the zero pressure will exist on line 33 to flow divider 34.

With the conditions present in the speed control system due to the above-described overtaking movement of extensible drawbar, the high pressure or displaced fluid on the right-hand side of pistons 28a and 29a of slave cylinders 28 and 29, respectively, moves same from right to left or in a direction to turn off the associated hydrostatic transmission and throttle via linkages 30 and 31. It is, therefore, understood that spring biasing arrangements and normal throttle controls are completely avoided as far as the safety of the operator of the prime mover is concerned since the system operates to insure that sources of motive power for the towed vehicles are constantly monitored and controlled by the position of same with respect to the prime mover. Furthermore, the gear-type pump and associated pressure regulators and valves fully compensate for fluid expansion contraction and/or possible system fluid leaks. As a result, the satisfactory operation of the device is maintained regardless of the normal wear expectancy of oil rings and seals which may totally disrupt a similar system.

From the foregoing, it will be seen that this invention is one well adapted to attain all of the ends and objects hereinabove set forth together with other advantages which are obvious and which are inherent to the device.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A speed control device for a towed self-propelled vehicle wherein the towed vehicle has a power means for propelling same and control linkages associated therewith which are positionable to turn said power means on or off, said vehicle operable to be towed by a towing prime mover, said device comprising,
   an extensible drawbar interconnecting said prime mover and said vehicle,
   a master hydraulic cylinder having a piston operatively associated with said drawbar, said piston movable with respect to said cylinder in accordance with the relative location of said prime mover and said vehicle,
   a slave cylinder means hydraulically connected with said master cylinder and further operatively connected with said control linkages, said slave cylinder means operable in response to said master cylinder piston to control the positioning of said control linkages thereby controlling the condition of said power means, and
   hydraulic means including a hydraulic fluid pump for insuring that said power means is turned off when said vehicle inadvertently overtakes said prime mover, a variable pressure regulator, and means for hydraulically interconnecting said pump and said variable pressure regulator with said master cylinder, said slave cylinder means being actuated in accordance with a pressure condition within said variable pressure regulator to operate said control linkages.

2. A speed control device for a self-propelled vehicle wherein said towed vehicle has a power means for propelling same and control linkages associated therewith which are positionable to turn said power means on or off, said towed vehicle including a transmission means with associated control linkages for transmitting the motive power developed by said power means to operatively propel said towed vehicle, said vehicle operable to be towed by a towing prime mover or another self-propelled towed vehicle, said device comprising
   an extensible drawbar interconnecting said prime mover and said vehicle,
   a master hydraulic cylinder having a piston operatively associated with said drawbar, said piston movable with respect to said cylinder in accordance with the relative location of said prime mover and said vehicle,
   a slave cylinder means, and
   at least one variable pressure regulator hydraulically connected between said slave cylinder means and said master cylinder, said slave cylinder means further operatively connected with said control linkages of said power means and said transmission means, said slave cylinder means operable in response to said master cylinder piston and said variable pressure regulator to control the positioning of said control linkages thereby controlling the condition of said power means and said transmission means, said positioning of said linkages being variable in accordance with the variable and controlled pressure at least partly established by said variable pressure regulator 3. The invention as in claim 2 wherein said device includes a fluid pump interconnected with said variable pressure regulator, means for hydraulically interconnecting said pump and said variable pressure regulator with said master cylinder, said slave cylinder means being actuated in accordance with a pressure condition within said variable pressure regulator.

4. The invention as in claim 2 including means for connecting a plurality of variable pressure regulators between said slave cylinder means and said master cylinder.

5. A speed control device for a towed self-propelled vehicle wherein the towed vehicle has a power means for propelling same and control linkages associated therewith which are positionable to turn said power means on or off, said vehicle operable to be towed by a towing prime mover, said device comprising, an extensible drawbar interconnecting said prime mover and said vehicle, a master hydraulic cylinder having a piston operatively associated with said drawbar, said piston movable with respect to said cylinder in accordance with the relative location of said prime mover and said vehicle, a slave cylinder means hydraulically connected with said master cylinder and further operatively connected with said control linkages, said slave cylinder means operable in response to said master cylinder piston to control the positioning of said control linkages thereby controlling the condition of said power means, hydraulic means, including a hydraulic fluid pump, for insuring that said power means is turned off when said vehicle inadvertently overtakes said prime mover, wherein said insuring means includes means for hydraulically interconnecting said master cylinder with said slave cylinder means, said last-mentioned hydraulic interconnecting means including a hydraulic fluid reservoir, at least one variable pressure regulator, means interconnecting said master cylinder with said variable pressure regulator, means interconnecting said pump with said variable pressure regulator, means interconnecting said variable pressure regulator with said slave cylinder means so that said control linkages turn off said power means when said vehicle inadvertently overtakes said prime mover.